US009260791B2

(12) United States Patent
Pedraza Diaz et al.

(10) Patent No.: US 9,260,791 B2
(45) Date of Patent: Feb. 16, 2016

(54) METHOD OF FABRICATING A THERMAL BARRIER

(75) Inventors: Fernando Pedraza Diaz, La Rochelle (FR); Baptiste Bouchaud, Saint Sornin (FR); Josseline Balmain, La Rochelle (FR); Gilles Bonnet, La Rochelle (FR); Justine Menuey, Chatellerault (FR)

(73) Assignees: SNECMA, Paris (FR); UNIVERSITE DE LA ROCHELLE, La Rochelle (FR)

( * ) Notice: Subject to any disclaimer, the term of this patent is extended or adjusted under 35 U.S.C. 154(b) by 1054 days.

(21) Appl. No.: 13/387,747

(22) PCT Filed: Jul. 29, 2010

(86) PCT No.: PCT/FR2010/051614
§ 371 (c)(1),
(2), (4) Date: Jan. 30, 2012

(87) PCT Pub. No.: WO2011/012819
PCT Pub. Date: Feb. 3, 2011

(65) Prior Publication Data
US 2012/0125778 A1 May 24, 2012

(30) Foreign Application Priority Data
Jul. 30, 2009 (FR) ...................................... 09 55369

(51) Int. Cl.
C25D 5/50 (2006.01)
C25D 9/08 (2006.01)
F01D 5/28 (2006.01)

(52) U.S. Cl.
CPC .. C25D 9/08 (2013.01); C25D 5/50 (2013.01); F01D 5/284 (2013.01); F01D 5/288 (2013.01);
(Continued)

(58) Field of Classification Search
CPC .................................. C25D 9/08; C25D 5/50
USPC .......................................... 205/333; 204/224
See application file for complete search history.

(56) References Cited

U.S. PATENT DOCUMENTS 4,483,720 A * 11/1984 Bartlett et al. ................ 148/280
4,882,014 A * 11/1989 Coyle et al. ..................... 205/45
(Continued)

FOREIGN PATENT DOCUMENTS

| CN | 1495235 A | 5/2004 |
| EP | 1 400 610 A1 | 3/2004 |

(Continued)

OTHER PUBLICATIONS

Zhitomirsky, I. et al. "Electrochemical Deposition of ceria and doped ceria films" Ceramics International, 27, 2001, p. 149-155.*
(Continued)

*Primary Examiner* — Nicholas A Smith
*Assistant Examiner* — Brian W Cohen
(74) *Attorney, Agent, or Firm* — Oblon, McClelland, Maier & Neustadt, L.L.P.

(57) ABSTRACT

The invention relates to a method of fabricating a thermal barrier comprising a ceramic coating layer covering at least a portion of the structure of a substrate, wherein the ceramic coating layer is deposited on the substrate solely by a cathodic electrodeposition process between at least one cathode (26) and at least one anode (28), the substrate being formed of an electron-conducting material and constituting the cathode. In characteristic manner, the electrolyte (24) comprises at least one salt from the group comprising the salts of lanthanides, of yttrium, of zirconium, and of hafnium, such that the coating layer applied by the electrodeposition process includes at least one oxide from the group comprising the oxides of lanthanides, of yttrium, of zirconium, and of hafnium, and it also includes a step of heat treating the ceramic coating layer at a temperature lying in the range 400° C. to 2000° C. for a duration of at least 10 min.

19 Claims, 4 Drawing Sheets

(52) U.S. Cl.
CPC ......... *F05D 2230/31* (2013.01); *F05D 2230/90* (2013.01); *F05D 2300/15* (2013.01); *Y02T 50/67* (2013.01); *Y02T 50/672* (2013.01)

(56) References Cited

U.S. PATENT DOCUMENTS

| | | | |
|---|---|---|---|
| 4,886,583 A | * | 12/1989 | Martinou et al. ............. 205/109 |
| 5,244,872 A | * | 9/1993 | Ikemachi et al. ............. 505/441 |
| 2004/0016646 A1 | | 1/2004 | Stucky et al. |
| 2004/0026260 A1 | | 2/2004 | Stoffer et al. |
| 2004/0191545 A1 | * | 9/2004 | Han .................... C23C 16/4404 428/472 |
| 2007/0252232 A1 | * | 11/2007 | Ino et al. ........................ 257/499 |
| 2010/0167084 A1 | | 7/2010 | Bhattacharya et al. |

FOREIGN PATENT DOCUMENTS

| | | |
|---|---|---|
| WO | 02 14586 | 2/2002 |
| WO | 02 29134 | 4/2002 |
| WO | 2007 015692 | 2/2007 |

OTHER PUBLICATIONS

Zhou, Y. et al. "Electrochemical Synthesis and Sintering of Nanocrystalline Cerium (IV) Oxide Powders" J. Am. Ceram. Soc. 78(4), 1995, p. 981-985.*
Hamlaoui, Y. et al. "Cathodic electrodeposition of cerium-based oxides on carbon steel from concentrated cerium nitrate solutions. Part I. Electrochemical and analytical characterisation" Materials Chemistry and Physics, 113, 2009, p. 650-657.*
Zhou, Y. et al. "Growth of cerium(IV) oxide films by electrochemical generation of base method" Journal of Alloys and Compounds, 237, 1996, p. 1-5.*
Phok, Sovannary et al. "Effect of samarium doping on electrodeposited $CeO_2$ thin films" Phys. Stat. Sol. (a) 203, No. 15, p. 3734/3742, 2006.*
English translation of the Chinese Office Action issued Mar. 5, 2014, in Chinese Patent Application No. 2010800340323.
Chen Shi-Liu, et al., "High-temperature oxidation performance of 8mol%YSZ thin film", Corrosion & Protection, vol. 27, No. 7, Jul. 2006, pp. 328-330 and p. 343 (with English Abstract).
International Search Report Issued Nov. 11, 2010 in PCT/FR10/51614 Filed Jul. 29, 2010.

* cited by examiner

METHOD OF FABRICATING A THERMAL BARRIER

The present invention relates to a method of fabricating a thermal barrier comprising a ceramic coating layer covering a substrate, in particular a substrate for use in high temperature applications, in particular in the field of aviation.

Such a ceramic coating layer is used in particular as a thermal barrier: because of its thermal insulation properties (very low thermal conductivity), it is possible to lower the operating temperature of the underlying substrate by means of a temperature gradient that may exceed 100° C.

Furthermore, metal layers are used either on their own or as an underlayer between the substrate and the ceramic coating layer, for their properties of resistance to corrosion by oxidation when hot, in particular when the metal layers include aluminum which gives rise to a layer of $\alpha\text{-}Al_2O_3$ alumina that provides protection in particular under conditions in which dioxygen is present at a low partial pressure and/or at temperatures higher than 1000° C. under atmospheric pressure. Mention may be made in particular of layers of aluminides and of alloys of the MCrAlY type, where M is a metal selected from nickel, cobalt, iron, or a mixture of these metals. Such oxidation takes place in particular in natural manner in air at high temperatures.

At present, several methods are known for fabricating such ceramic or metallic layers.

The method of deposition by chemical vapor deposition (CVD) is a method of depositing thin films from gaseous precursors. It presents the advantage of being relatively inexpensive and of enabling distribution to be uniform and also of enabling the thickness of the coating layer to be controlled. In contrast, that fabrication method makes use of polluting species (precursors/activators) and it requires subsequent treatment of such waste. In addition, working temperatures are relatively high and the time required for fabricating the coating layer is of the order of several hours, not less than three hours, for applications to thermomechanical parts in fields such as aviation.

The coating layers deposited on substrates by that technique are conventionally layers of aluminides. In order to improve the lifetime and the performance of substrates with their coating layers, proposals have been made in particular to improve the adhesion of the protective oxide layer by plating the aluminide layers in platinum. Nevertheless, platinum is a raw material that is very expensive and platinum plating gives rise to a certain number of additional operations before aluminization, thereby further increasing production costs.

Thermal spraying techniques consist in sending a vector gas that serves to accelerate fine particles (typically having a size of 5 micrometers (μm) to 100 μm) and to transport them to the substrate, which particles may be in the liquid, pasty, or even solid state. The vector gas may also be a source of enthalpy, serving to heat the particles up to their melting point (in particular with plasma spraying). In general, spraying techniques are directional, i.e. they send a jet along a linear axis, such that this technique requires automatic systems or expensive post-treatment to be implemented for the purpose of spraying and/or equalizing the sprayed layer on all of the portions of a substrate having a geometrical shape that is complex. In addition, the spraying technique makes use of powders that are fabricated using processes that are polluting, in particular vacuum atomization.

The coating layers deposited on substrates by that technique are conventionally layers of MCrAlY, e.g. FeCrAlY, CoCrAlY, or NiCOCrAlY. In order to be deposited, those layers need to be thermally and chemically compatible with the substrate.

Another known technique consists in adding reactive elements in metallic form to the surface of an alloy or a coating by implanting ions. That relatively expensive technique requires the use of a particle accelerator and of a vacuum enclosure, thereby putting a limit on the size of the parts/substrates that can be implanted and it allows doping to take place at the surface only, to a depth of about 0.05 μm to 0.5 μm. The geometry of the parts/substrates must also be simple, essentially plane.

It is also possible to form said layer by applying an aqueous or an organic suspension (a slurry or a sol-gel) forming a paint that may be applied by means of a brush, or by dipping the parts in the paint, which paint is subsequently vaporized. Nevertheless, under such circumstances, binders are used, in particular organic binders and they release volatile elements that might be harmful. In addition, in order to obtain sufficient thickness for the coating layer, it is necessary to apply the suspension on several succession occasions, thereby making the process relatively lengthy to implement, given the intermediate drying steps. Furthermore, it is difficult to apply such a suspension in uniform manner on parts that are complex in shape.

It can also be understood that, when coating parts include cooling holes, those various techniques of the prior art give rise to the holes being obstructed at least in part during the formation of the coating layer.

The present invention seeks to mitigate the drawbacks of methods of fabricating a coating layer for substrates/parts of complex shape by proposing a method that is simple, inexpensive, and non-polluting, for the purpose of obtaining a thermal barrier with a coating layer that is substantially uniform and that presents properties that are appropriate for the intended applications.

Thus, the invention relates to a method of fabricating a thermal barrier comprising a ceramic coating layer covering at least a portion of the structure of a substrate, wherein the ceramic coating layer is deposited on the substrate solely by a cathodic electrodeposition process (CELD) between at least one cathode and at least one anode, the substrate being formed of an electron-conducting material and constituting the cathode.

According to the invention, the electrolyte includes at least one salt from the group comprising the salts of lanthanides, of yttrium, of zirconium, and of hafnium, such that the coating layer applied by the electrodeposition process includes at least one oxide from the group comprising the oxides of lanthanides, of yttrium, of zirconium, and of hafnium, and the fabrication method also includes a step of heat treating the ceramic coating layer at a temperature lying in the range 400° C. to 2000° C. for a duration of at least 10 minutes (min).

This method makes it possible to form a coating layer either directly on the substrate constituting the material of the part, or else on an underlayer covering the part and then constituting the substrate that is to be covered.

It is also possible to cover only a portion of the surface of the substrate, e.g. by using a mask in the zone(s) in which it is not desired to deposit the coating layer, or indeed by local electrodeposition.

After implementing the fabrication method in accordance with the invention in order to form the coating layer, it is also possible to make provision for the complete preparation of the coating to include depositing one or more other layers, in particular using the above-mentioned prior art deposition techniques.

Such a method of the invention for fabricating a coating layer is particularly ecological and inexpensive (short implementation time, implementation under atmospheric pressure avoiding the use of vacuum equipment) compared with thermal spraying or vapor deposition techniques. In this way, it is possible to coat parts that have not been suitable for coating in the past.

In addition, implementing the fabrication method of the present invention is compatible with parts that are pierced: the shape of the current lines prevents any significant deposition taking place in the holes, in particular in cooling holes of small size that are thus not obstructed.

It should also be observed that using such a method avoids having recourse to dangerous chemicals and to producing toxic waste.

Finally, the fabrication method of the present invention is simple to implement: the electrolyte, the cathode (the part for coating), and the anode are preferably placed in a single vessel.

Among lanthanide salts, it is preferable to select cerium, or indeed lanthanum and/or gadolinium, however it is also possible to use any of the other lanthanides, i.e. praseodymium, neodymium, promethium, samarium, europium, terbium, dysprosium, holmium, erbium, thulium, ytterbium, and lutetium.

In a preferred arrangement, use is made solely or essentially of one or more salts of cerium, so as to lead to a ceramic layer being formed that is based on cerium oxides.

The term "based on cerium oxides" means that the ceramic layer presents cerium oxides as a majority and possibly even as sole constituents, in particular $Ce_2O_3$ and/or $CeO_2$.

In a preferred arrangement, said electrolyte includes at least two salts from the group comprising the salts of lanthanides, of yttrium, of zirconium, and of hafnium, such that the electrodeposition process produces a coating layer having at least two oxides from the group comprising the oxides of lanthanides, of yttrium, of zirconium, and of hafnium.

This serves to achieve co-deposition of oxyhydroxides of a mixture of rare earths in a single step (e.g. cerium and lanthanum, or indeed cerium and lanthanum and gadolinium, etc.).

In another preferred arrangement, said electrolyte includes at least one cerium salt such that the electrodeposition process produces a coating layer having at least one cerium oxide. This applies when the electrolyte has one, two, or more salts from the group comprising the salts of lanthanides, of yttrium, of zirconium, and of hafnium.

Preferably, said substrate is formed in a material belonging to the group comprising superalloys, nickel-based superalloys, cobalt-based superalloys, titanium and alloys thereof, intermetallic compounds based on aluminides and/or silicides, metallic matrix composites, ceramic matrix composites, and organic matrix composites.

If the substrate is based on aluminide(s), one of the following aluminides or a mixture of them is/are selected in particular: nickel, cobalt, iron, titanium, ruthenium, and platinum aluminide. If the substrate is based on silicides, one of the following silicides or a mixture thereof is/are selected in particular: molybdenum silicide and iron silicide.

Other characteristics and advantages of the invention appear better on reading the following description of several preferred implementations of the invention given as non-limiting examples. The description refers to the accompanying drawings, in which.

Figure 1:
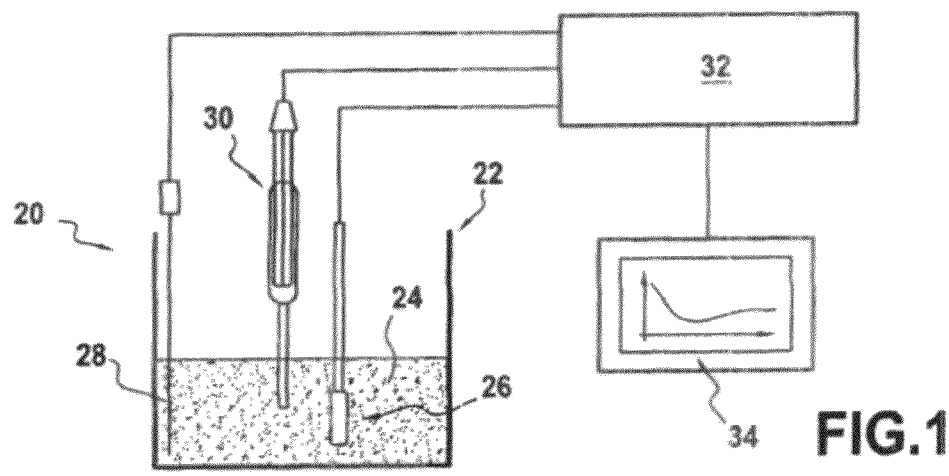
FIG. 1 is a diagram of a setup suitable for use in implementing a method of fabricating of the invention.

The electrodeposition installation 20 that may be used comprises a single vessel 22 filled with electrolyte 24 into which the part forming the substrate for covering is dipped and serves as a cathode 26 (working electrode). An anode 28 (or counter-electrode) is also immersed in the electrolyte 24. The anode 28 is constituted by a material that is chemically inert relative to the electrolyte bath (electrolyte), e.g. in the form of a platinum grid, and it is positioned in such a manner as to create current lines that are uniform at the substrate (cathode 26).

Advantageously, the electrodeposition process also uses a reference electrode 30 that is placed close to the cathode 26 so as to minimize the effects of the resistance of the electrolyte 24 and so as to provide better control during electrodeposition. This reference electrode 30 is preferably constituted by a saturated calomel electrode (SCE), where calomel is mercurous chloride $Hg_2Cl_2$.

This three-electrode electrodeposition installation 20 enables current density and voltage to be tracked accurately in situ, while simultaneously making the coating layer.

The three electrodes (cathode 26, anode 28, and reference electrode 30) are connected to an electric current source 32 that is coupled to a control and data acquisition system 34.

In a first alternative, the potentiostatic mode is used in which the electric current source 32 imposes a potential (or voltage) between the anode 28 and the cathode 26. Under such circumstances, the electric current source 32 is a potentiostat and the electrodeposition process is performed by applying a voltage between the cathode 26 and the anode 28. The voltage applied between the cathode 26 and the anode 28 preferably lies in the range −30 volts (V) to +30 V, and more preferably lies in the range −2.5 V to +2.5 V.

In a preferred, second alternative, the galvanostatic mode is used, in which the electric current source 32 imposes a current density between the anode 28 and the cathode 26. Under such circumstances, the electric current source 32 is a galvanostat and the electrodeposition process is performed by applying a current density between the cathode 26 and the anode 28. The current density applied between the cathode 26 and the anode 28 preferably lies in the range −0.5 milliamps per square centimeter ($mA/cm^2$) to −5 $mA/cm^2$, and more preferably in the range −0.5 $mA/cm^2$ to −2 $mA/cm^2$.

The electrolyte contains the one or more species for depositing on the cathode in the form of salts dissolved in the electrolyte 24. Applying a current density or an electric potential serves to reduce the species with which the ceramic coating layer is to be formed at the interface (diffusion layer) between the volume of electrolyte and the surface of the cathode 26 (substrate).

It is possible to obtain characteristics that are uniform or that present a gradient across the thickness of the deposit (in terms of composition, microstructure, crystallographic characteristics, . . . ).

The salts comprise one or more anionic and/or cationic species, in particular nitrates, sulfates, chlorides, or acetate, with a preference for nitrates. Thus, the electrolyte preferably comprises nitrate salts, in particular cerium nitrate, at a concentration greater than or equal to 0.05 moles per liter (mol/L). It is possible to provide for the nitrate salts to be at a concentration greater than or equal to 0.1 mol/L.

The one or more cationic species of the electrodeposited coating layer belong to the group constituted by species of the lanthanide series, yttrium, zirconium, and hafnium. It is preferable to use cerium (alone or as a basis) or any combination including cerium. The use of lanthanum or gadolinium is also preferred.

The electrolyte 24 presents a composition and a concentration that depend on the quantity of salt dissolved in the solvent. In particular, the electrolyte 24 presents high ionic conductivity, lying in the range 25 millisiemen square meters per mol (mS·m²/mol) to 1000 mS·m²/mol, and preferably in the range 150 mS·m²/mol to 500 mS·m²/mol.

The electrolyte 24 is a relatively concentrated solution of one or more salts containing one or more lanthanides and/or yttrium and/or zirconium and/or hafnium. Thus, provision is made for the total concentration of the electrolyte 24 to lie in the range 0.05 mol/L to 5 mol/L.

Preferably, the salts of lanthanides, of yttrium, of zirconium, and of hafnium are initially in the electrolyte at a concentration lying in the range 0.05 mol/L to 5 mol/L, and more preferably in the range 0.1 mol/L to 0.3 mol/L.

The solvent of the electrolyte 24 is aqueous-based, or a solution of alcohol (ethanol), or indeed is based on cetone, ester, or aldehyde, or indeed a mixture of two of them. It is preferred to use an electrolyte with an aqueous-based solvent since that is less polluting and easier to regenerate.

Preferably, the temperature of the electrolyte 24 lies in the range 4° C. to 100° C., and more preferably in the range 15° C. to 25° C. (ambient temperature) in order to avoid high levels of evaporation and in order to consume less energy for maintaining the temperature of the electrolyte 24. In addition, such a temperature range makes it possible to obtain crystal sizes and a concentration of oxygen vacancies that are optimized for applications against high temperature oxidation and/or thermal barrier applications.

Preferably, the pH of the electrolyte 24 is less than 7, and it may be clearly acidic, lying in the range 2.5 to 5.5.

In additional but non-essential manner, the electrolyte 24 may also include one or more additives and/or surfactants.

The vessel 22 containing the electrolyte and the three electrodes 26, 28, and 30 is in contact with ambient air at atmospheric pressure. The vessel 22 is immersed relative to the electrolyte 24. It is possible for the electrolyte 24 to be stirred lightly.

Electrodeposition preferably does not last more than 1 hour (h). This duration preferably lies in the range 10 minutes (min) to 30 min, and more preferably in the range 15 min to 25 min. Thus, the fabrication method of the invention can be implemented relatively quickly.

During the electrodeposition, one or more reduction reactions (1) to (4) are obtained, serving to produce hydroxyl ions OH⁻, in particular from the oxygen $O_2$ and the water $H_2O$ of the electrolyte 24:

   (1)

   (2)

   (3)

   (4)

Sometimes, the anions of the salt may contribute to cathode reactions. Thus, in particular with nitrates, the equations are as follows:

   (5)

   (6)

Since the electrolyte 24 presents an acid pH, the presence of $H_3O^+$ cations and the formation of hydroxyl ions OH⁻ (base) may also contribute to forming compounds containing the base and the cations to be deposited.

Thus, for the particular circumstance of cerium cation and hydroxyl anion species, the formation of $Ce(OH)_3$ and/or of $Ce(OH)_2^{2+}$ is encouraged, in particular by reactions (7) to (9):

   (7)

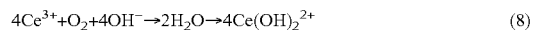   (8)

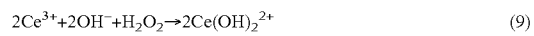   (9)

Finally, oxidation and/or partial dehydration of the electrodeposited compounds may occur. In the specific circumstance of species including cerium, $Ce^{3+}$ may be oxidized to $Ce^{4+}$:

   (10)

   (11)

The coatings are thus formed by basic electro-generation, by reaction with the cationic species present in the electrolyte, either by electro-crystallization or by precipitation.

The coating layer results form the initial formation of a film having the general composition $T(OH)_{z-x}(L)_x \cdot YH_2O$ where:

T (rare earth) belongs to the group comprising lanthanides, yttrium, zirconium, and hafnium, and in particular cerium alone or in the presence of another rare earth oxide;

L is a ligand (such as nitrate or any other anion);

z is the number of positive charges of the starting salt;

x is the number of negative charges of the ligand; and

Y is the number of water molecules.

In another arrangement that is preferred, but optional, the fabrication method of the invention also includes a step of drying the coating layer. Such a step is preferably performed at ambient temperature for at least 24 h, and preferably up to 48 h.

More precisely, once electrodeposition is terminated, the coated parts may optionally be rinsed using various solvents (water, alcohol, cetone, ester, aldehyde) and then optionally dried with a stream of cold or hot air or of some other gas at a power that is sufficiently low to avoid completely detaching the coating from the substrate, or the parts may be stored for a certain duration in an enclosure in the presence of a hygroscopic substance, or any other method may be used, e.g. air conditioning, so as to cause at least part of the moisture in the coating to evaporate. The preferred method is rinsing in alcohol followed by a first drying step using a light stream of hot air followed by a second drying step by storage under reduced pressure (in a desiccator and preferably for at least 24 h).

In another arrangement that is preferred, but optional, possibly after a drying stage, the fabrication method of the invention also includes a heat treatment drying step that is applied to the coating layer at a high temperature, preferably lying in the range 400° C. to 2000° C. for a duration of at least 10 min.

The pressure in the enclosure may be atmospheric or lower. The gaseous atmosphere in the enclosure may be completely or partially oxidizing and/or inert and/or reducing, but must not include any corrosive substance such as $SO_2$, HCl, etc., that could give rise to a substance being formed in the coating and that contains species other than oxygen, nitrogen, carbon, lanthanides, yttrium, zirconium, hafnium, or any combination of these species (in neutral, cationic, anionic, covalent, or metallic form).

Under such circumstances, and preferably, the heat treatment is performed under argon at atmospheric pressure in the presence of at least 0.0001 bar of oxygen, and preferably for a duration of 60 min at 1050° C. Under such circumstances, use is preferably made of rising and falling temperature ramps at 5 degrees Celcius per minute (° C./min).

Such additional heat treatment of the part coated in the coating layer makes it possible to modify and adapt specifically the composition, the microstructure, the crystal structure, and/or the thickness of the coating layer. Such adaptation serves to improve the property(ies) corresponding to the intended application, such as ability to withstand cyclic oxidation, ability to withstand isothermal oxidation, a reduction in thermal conductivity, reduced dependence on the presence of a layer of alumina obtained by natural oxidation, and greater ability to withstand deposits of molten salts or "CMAS" (for "$CaO$—$MgO$—$Al_2O_3$—$SiO_2$", i.e. oxide compositions containing oxides of calcium, magnesium, aluminum, and silicon, and mixtures of such oxides, resulting from the engine ingesting sand and/or any other debris coming from the upstream portion of the engine).

In this way, by the fabrication method of the invention, a deposit of a coating layer is obtained in the form of a compound of a nature that is ceramic (and not metallic, since metallization is not involved as it is in the phenomenon that results from conventional electrodeposition).

The coating layers obtained by the fabrication method of the invention present a composition based on oxides (of lanthanides and/or yttrium and/or zirconium and/or hafnium) containing a varying quantity of water (metallic hydroxides), and also including hydroxyl anions or any other anion produced from the salts and the solvents.

Thus, in addition to an oxide belonging to the group constituted by oxides of lanthanides, of yttrium, of zirconium, and of hafnium, the coating layer also includes at least one metallic hydroxide of formula $M_x(OH)_y$ (where M is lanthanide metal, yttrium, zirconium, and/or hafnium, x is the negative charge of the hydroxyl anion (OH$^-$), and y is the number of positive charges of the lanthanide metal, yttrium, zirconium, and/or hafnium) and at least one hydroxyl anion (OH$^-$).

More specifically, the coating layer, after drying and/or heat treatment, comprises a metallic oxyhydroxide of formula MO.OH in which M is a lanthanide metal, yttrium, zirconium, and/or hafnium, and preferably cerium.

The coating layers may present a varying composition that contains one or more elements from the group constituted by lanthanides, yttrium, zirconium, and hafnium; but also oxygen, nitrogen, carbon (or any other species contained in the counter-ion of the electrolyte); together with nickel and/or aluminum and/or chromium and/or cobalt and/or titanium and/or tungsten and/or tantalum and/or molybdenum and/or rhenium and/or ruthenium and/or niobium and/or silicon and/or iron and/or manganese and/or platinum and/or palladium and/or iridium.

According to an advantageous arrangement, the coating layer is formed from abase of cerium oxide(s), optionally completed with at least one other rare earth oxide forming a stabilizer (dopant).

The coating layers obtained by the fabrication method of the invention may have a structure that is amorphous and/or crystalline and/or nanometric (elements having size of nanometer order). In general, the coating layers present a minimum percentage of crystalline phase with crystals having a size in the nanometric range.

Depending on the parameters selected for electrodeposition, the coating layers obtained by the fabrication method of the invention present properties of withstanding high temperature oxidation and/or a thermal barrier effect and/or an effect of capturing harmful species.

Under all circumstances, a specific morphology, consisting in a so-called "dry mud" earthenware microstructure containing pores (and optionally cracks) may be observed on the outside face of the coating layer as obtained by the fabrication method of the invention (FIGS. 2 to 6).

Figure 2:
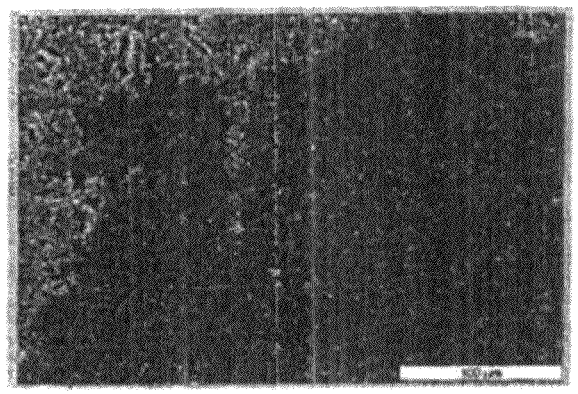
FIGS. 2 to 4 are micrograph views of the surface of a coating layer obtained by the method of fabricating of the present invention, while using different current densities.
Figure 3:
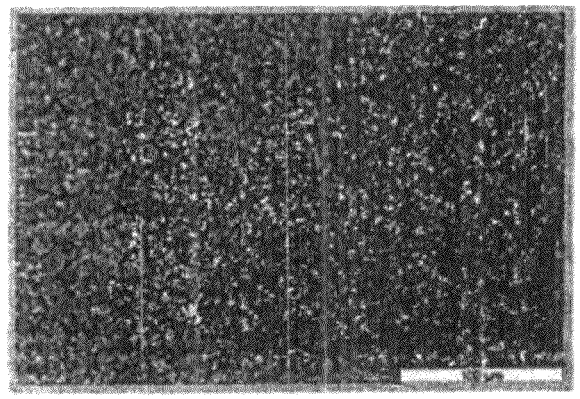
Figure 4:
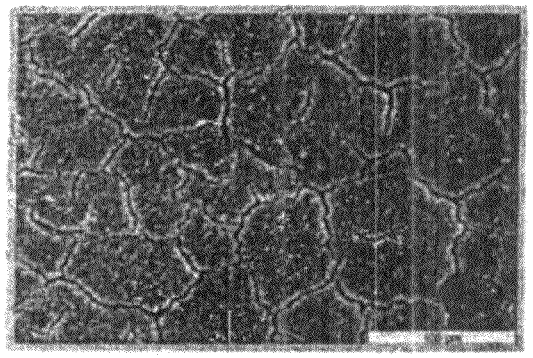

As can be seen in FIGS. 2 to 4 that show the surface of a coating layer formed solely with a cerium oxide base (and with drying), for different current densities that increase from FIG. 1 to FIG. 4, it is possible to obtain different morphologies (−0.5 mA/cm$^2$ for FIG. 2, −1 mA/cm$^2$ for FIG. 3, and −1.5 mA/cm$^2$ for FIG. 4).

In addition, increasing the current density used causes cracks to appear (FIGS. 3 and 4) of size (length, width, and depth) that increases.

Varying the current density also modifies the composition at the surface of the coating layer: applying a lower current density gives rise to a higher concentration of substrate elements present in the coating, since it presents a smaller thickness compared with higher current densities, particularly with nickel for substrates that are based on nickel alloy.

The thickness of the deposit also increases with the applied current density and with the deposition time.

A maximum of 35 at % of rare earths has been observed when using maximum current densities.

Figure 5:
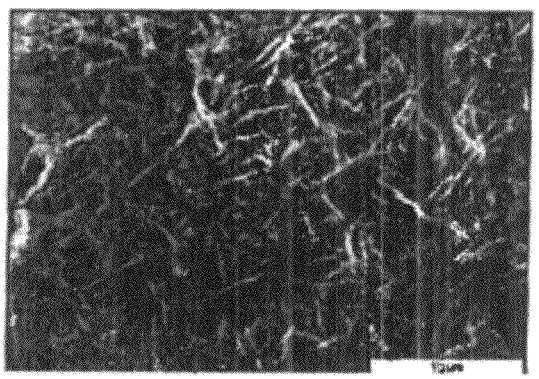
FIGS. 5 and 6 are micrograph views of the surface of a coating layer obtained by the method of fabrication of the invention, while using different formulations of salts contained in the electrolyte.

FIG. 5 also shows a coating layer formed solely on the basis of cerium oxides, the greater magnification revealing the tangling of the needle-shaped structures on the outside face of the coating layer. The term "needle-shaped structure" means a structure in which the micrographic constituents appear to have a needle shape in a metallographic section, as a result of the presence of a morphology that is elongate in a privileged direction in three dimensions for the elements making up the structure.

Figure 6:
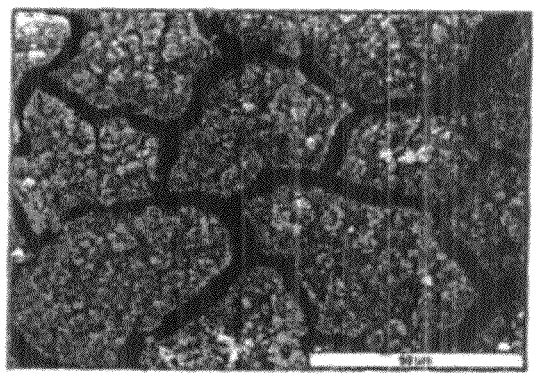

In comparison, FIG. 6 shows that for a coating layer made using a mixed oxide (specifically oxides of cerium and of gadolinium), a nodular microstructure can appear on the outside face of the coating layer. The term "nodular microstructure" is used to mean the presence of micrographic constituents that are of an irregular round shape, as a result of the presence of a rounded morphology without preferential lengthening of the elements making up the structure.

The coating layer resulting from the fabrication method of the present invention grows layer by layer and presents a certain number of particularities.

In particular, the coating layer presents a considerable concentration of oxygen vacancies, in particular a concentration of oxygen vacancies that is greater than or equal to $1 \times 10^{17}$ vacancies per cubic centimeter (vacancies/cm$^3$), and preferably greater than or equal to $10 \times 10^{20}$ vacancies/cm$^3$.

In addition, the coating layer presents a porous structure with a plurality of open cracks.

In the context of the present invention, the presence of such cracks is desired since they perform several roles. In particular, the presence of cracks makes it possible to avoid the coating layer (having a ceramic nature) from detaching from the substrate (generally having a metallic nature) as a result of different coefficients of thermal expansion, in particular during thermal cycling. Furthermore, the presence of such cracks provides the surrounding oxygen with limited access through the coating layer down to the substrate.

In particular, the distance between two adjacent cracks lies in the range 5 µm to 50 µm, and said cracks present a width l lying in the range 1 µm to 25 µm.

Most of the time, and in particular when either the substrate or the coating layer includes aluminum, a fine layer of protective oxide (in particular a layer of alumina) is formed at the interface between the coating layer and the substrate, thereby providing protection against oxidation or against hot corrosion. Such a protective oxide layer can be generated by oxidation of the substrate. The protective oxide layer contains aluminum, rare earths (lanthanides and/or yttrium and/or zirconium and/or hafnium), and oxygen.

This coating layer presents thickness of at least 5 µm.

With additional heat treatment of the part coated in the coating layer, the coating layer is dehydrated, thereby enabling the microstructure and/or the thickness and/or the composition of the coating layer to be modified.

In particular, with relatively moderate heat treatment temperatures, in particular temperatures of less than 900° C., the earthenware microstructure is maintained, the crystal structure is defined to a greater extent, the thickness of the deposit decreases, the surface concentration of rare earth decreases, and the elements of the substrate rise into the coating layer.

Figure 7:
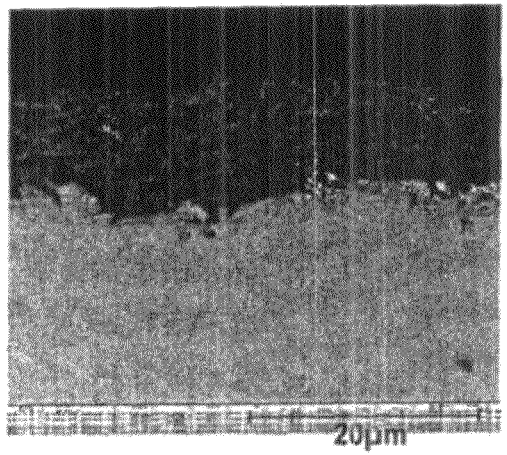
FIGS. 7 to 9 are micrograph sections showing the coating layer deposited on the surface of the substrate, respectively without heat treatment, with first heat treatment, and with second heat treatment.

Thus, FIG. 7 is a section view of a coating layer obtained by the method of the present invention, formed solely on the basis of cerium oxides $CeO_{2-x}$, on a substrate of the monocrystalline superalloy type based on nickel, and without heat treatment.

Figure 8:
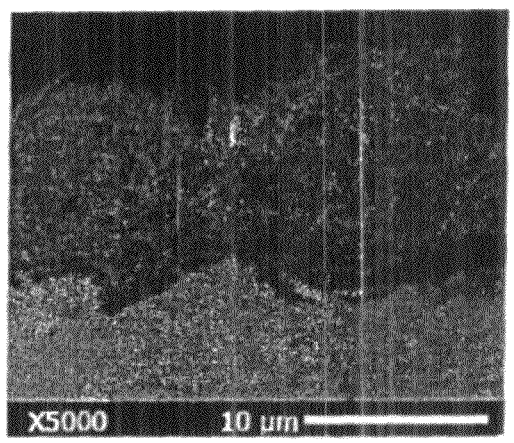

FIG. 8 shows the same coating layer as FIG. 7, but after heat treatment at a moderate temperature (typically 900° C. for 1 h), at the end of which the thickness has decreased and the needle-shaped microstructure is maintained.

If higher temperatures are used for heat treatment, in particular temperatures higher than 900° C., the microstructure becomes nodular, the thickness of the deposit decreases even more, and the oxide layer that develops at the interface is thicker.

Figure 9:
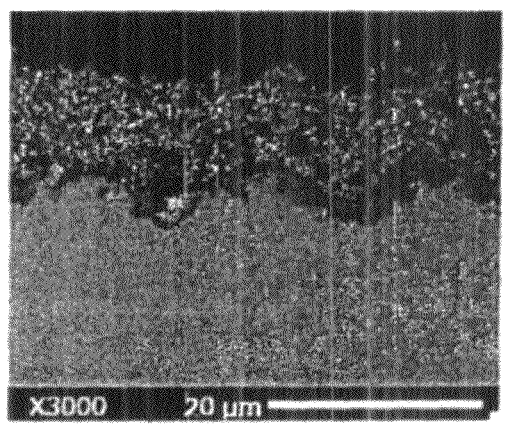

Thus, FIG. 9 shows the same coating layer as FIG. 7, after heat treatment at high temperature (specifically 1050° C. for 1 h) at the end of which the thickness of the coating layer has decreased and a nodular microstructure has appeared.

In order to promote the formation of the protective oxide layer, an oxidizing atmosphere is used for performing the treatment. It is therefore preferred to perform heat treatment under a reduced pressure of air.

For this purpose, in a preferred heat treatment, the part coated in the coating layer is placed in an enclosure at ambient temperature, which enclosure is then evacuated down to $5 \times 10^{-2}$ millibar (mbar), prior to raising the temperature at a rate of 5° C./min under a stream of argon at atmospheric pressure up to 1050° C., heat treatment being performed at that temperature for one hour under argon at a pressure of 1 bar, and then the temperature is lowered at a rate of 5° C./min under a stream of air down to ambient temperature. That constitutes the treatment performed under argon, at a reduced pressure of oxygen (residual oxygen present at at least 0.0001 bar, i.e. 10 pascals) in order to encourage oxidation.

The coating layer of FIG. 9 has been subjected to such heat treatment.

Figure 10:
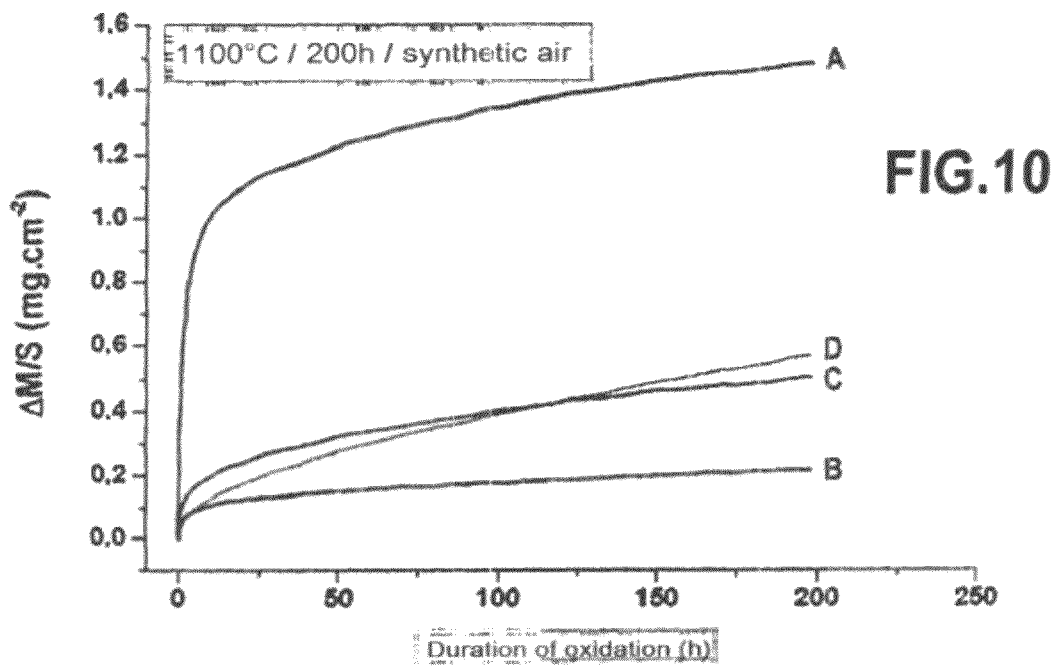
FIG. 10 shows the isothermal oxidation behavior of a bare substrate and of a substrate coated with various alternatives, as obtained by thermogravimetric analysis.
Figure 11:
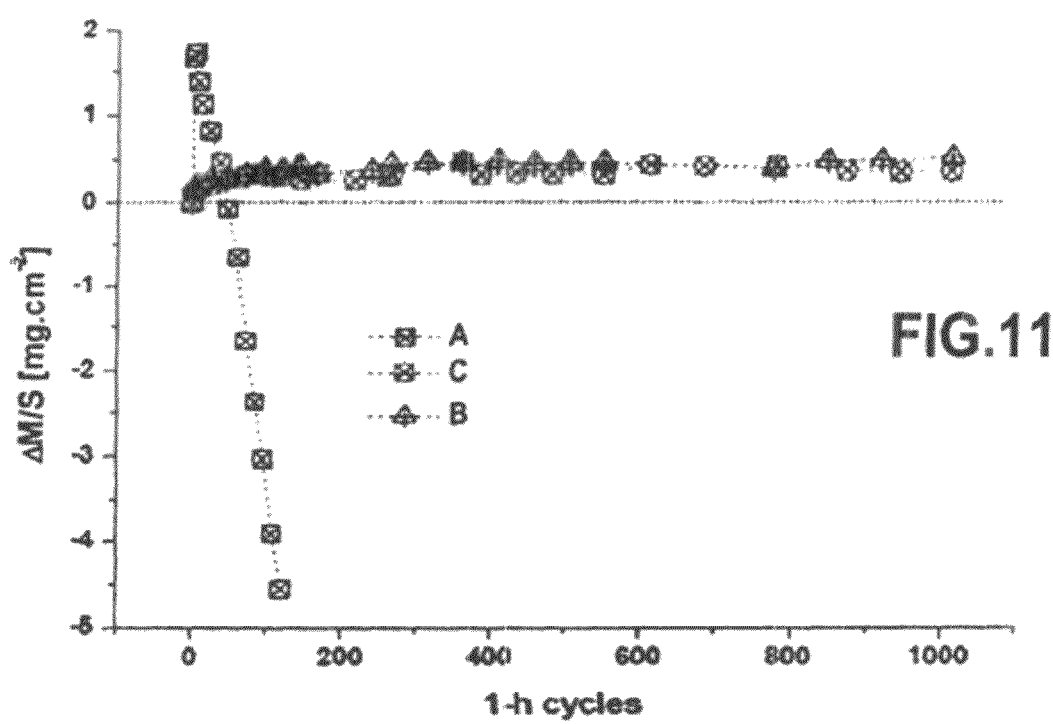
FIG. 11 shows the cyclic oxidation behavior of a bare substrate and of a substrate coated with various alternatives, as obtained by gravimetric analysis.

Reference is now made to FIGS. 10 and 11 that show respectively isothermal oxidation performance and cyclic oxidation performance for a bare substrate and for a substrate coated in various alternative ways. In FIG. 10, the gain in weight per unit area expressed in milligrams per square centimeter ($mg \cdot cm^{-2}$) is measured as a function of oxidation time at 1100° C. under air at atmospheric pressure. In FIG. 11, the gain in weight per unit area ($mg \cdot cm^{-2}$) is measured as a function of the number of cyclic oxidation cycles at 1100° C. under air at atmospheric pressure.

The curves A relate to a bare substrate of a nickel-based monocrystalline superalloy type. The curves B relate to the same substrate coated in nickel aluminide deposited by the vapor phase aluminizing (VPA) technique (aluminized substrate). The curves C relate to the same substrate coated in a coating layer made up of cerium oxides obtained by cathodic electrodeposition and heat treatment. Finally, in FIG. 10, the curve D relates to a part having the same substrate coated in an underlayer of nickel aluminide covered in a coating layer made up of cerium oxides obtained by cathodic electrodeposition and heat treatment.

In FIGS. 10 and 11, it can be seen that the coating layer (curve C) confers protection against high temperature oxidation (whether isothermal or cyclic) that is similar to that conferred by aluminizing (curve B). This significantly reduces the kinetics of oxidation compared with a bare substrate (curve A).

The presence of oxygen vacancies makes this resistance to high temperature oxidation possible by contributing to forming the protective oxide layer (in particular of alumina) at the interface between the coating layer and the substrate, this oxide layer subsequently partially preventing oxygen from entering into the interface.

It is during this formation of the alumina layer, by oxygen entering via the vacancies, that the greater gain in weight occurs that can be seen for curve C compared with curve B.

In FIG. 11, it can be seen that the resistance to cyclic oxidation is also good with the coating layer (curve C) and with the aluminization layer (curve B), and that it is much better than the resistance of a bare substrate.

The microstructure has been observed to vary, with a nodular microstructure appearing during isothermal oxidation (FIG. 10) or during cyclic oxidation (FIG. 11).

It should be observed that, according to the invention, it is possible to provide for the coating layer made of a majority of oxides (in particular cerium oxides) to be deposited by cathodic electrodeposition before or after deposition (whether CVD, or deposition by some other technique, in particular VPA) of an aluminide layer (in particular a nickel aluminide layer).

There follows a description of the preferred aspects of the protocol of implementation of the fabrication method of the present invention as a function of the specific property(ies) desired for the coating layer.

Application 1: High-Temperature Anti-Corrosion and/or Anti-Oxidation

Under such circumstances, the bath used is an aqueous bath of cerium nitrate $Ce(NO_3)_3$, $6H_2O$ at 0.1 mol/L, without stirring. The time required to make the deposit by electrodeposition preferably lies in the range 10 min to 20 min in order to obtain deposits that are sufficiently thick. The current density preferably lies in the range $-0.5$ $mA/cm^2$ to $-1.5$ $mA/cm^2$ in order to obtain the characteristics desired for the ceramic coating (size of cracking, microstructure, width of cracks). The deposits are rinsed in ethanol and then dried in hot air and finally stored for 48 h in dry air in a desiccator. After that, heat treatment is performed. The preferred treatment procedure is used (1050° C. and 1 h under a stream of argon).

Application 2: Thermal Barriers

Here the time required to make the deposit by electrodeposition preferably lies in the range 20 min to 60 min for thermal barrier applications. The applied current density is preferably low in order to limit excessive cracking and crack widths that are too pronounced, and lies in the range $-0.5$ mA/cm$^2$ to $-2$ mA/cm$^2$. The deposits are rinsed in ethanol and then dried in hot air, and finally stored for 48 h under dry air in a desiccator. After that, heat treatment is performed. The preferred treatment procedure is used (1050° C. and 1 h under a stream of argon).

The microstructures of the coating layer obtained with the fabrication method of the invention present pores and cracks, thereby achieving an additional reduction in the already low thermal conductivity of this type of ceramic.

Application 3: Reducing Greenhouse Gas Emissions

Here the time required to make the deposit by electrodeposition preferably lies in the range 20 min to 60 min in order to obtain relatively thick deposits that present a relatively large specific surface area (for exchange purposes) so as to be able to capture polluting and harmful species. The current density preferably lies in the range $-0.5$ mA/cm$^2$ to $-1.5$ mA/cm$^2$. The deposits preferably present a fraction of vacancies equal to or greater than $1 \times 10^{17}$/cm$^3$. The deposits are rinsed in ethanol and then dried in hot air, and finally stored for 48 h under dry air in a desiccator. After that heat treatment is performed. The preferred treatment procedure is used (1050° C. and 1 h under a stream of argon).

This effect of capturing harmful and polluting species that enables greenhouse gas emissions to be reduced (in particular from airplane engines) stems from the fact that the ceramic/oxide coating layer obtained by the process of the invention comprises at least one oxide from the group comprising oxides of lanthanides, yttrium, zirconium, and hafnium, which oxide acts as a catalyst. Because of its composition and because of its high density of vacancies, in particular oxygen vacancies, it is possible to capture gases (such as hydrocarbons, carbon monoxide, nitrogen oxides, soot, and other exhaust gas compounds) and, by means of redox reactions, to eliminate at least some of the harmful and/or polluting compounds, while renewing at least some of the ions suitable for reacting. It is also necessary to mention in parallel the good oxygen storage capacity (OSC) properties of the coating layer obtained by the process of the invention since by having oxygen vacancies present it follows that there is a phenomenon of capturing oxygen from the surroundings that acts not only in the context of oxidizing polluting gases, but that also acts by diffusion within the coating layer so as to form an oxide layer that is the most stable thermodynamically.

There follows a detailed description of the protocol relating to implementing the fabrication method of the present invention, as a function of the types of substrate used.

EXAMPLE 1

A layer of CeO$_{2-x}$ coating is made on a nickel-based substrate, in particular on a nickel-based superalloy substrate, by implementing steps 1.1 to 1.13.

Preparing the electrolytic bath (or electrolyte):

1.1: dissolving the Ce(No$_3$)$_3$, 6H$_2$O salt in water at the desired concentration:

1.2: hermetic storage to avoid contact with air and possible partial oxidation of the metallic cations (applies to cerium);

1.3: preparing the electrolytic bath: this is a beacon filled with 400 microliters (mL) of solution at ambient temperature without stirring; and 1.4: using a conventional electrochemical cell having three electrodes, namely a reference electrode 30, a broad platinum counter-electrode (anode 28) providing a good distribution of current density lines over the entire surface of the sample to be coated, which itself constitutes the working electrode (cathode 26).

Preparing the part for coating:

1.5: preparing its surface by sandblasting with alumina Al$_2$O$_3$ as is typical prior to depositing platinum Pt for vapor phase aluminization, but any other type of preparation need not be excluded (mechanical polishing, electrochemical preparation, etc.);

1.6: degreasing samples in an alcohol solvent, preferably ethanol and rinsing and then drying in hot air (50° C.<T<200° C.); and 1.7: fastening the sample/part via its section (edge) so as to avoid disturbing the formation of the film over its entire surface, using a system that provides electrical contact (such as a contact clamp, etc.), and that is inert (e.g.: Pt) relative to the electrodeposition electrolytic bath.

Electrodeposition:

1.8: connecting the contact clamp to the potentiostat (or galvanostat) serving both to control the setpoint for application (imposed potential or imposed current) and to record the response of the system on being polarized (thus enabling in situ tracking to take place);

1.9: immersing the part for coating in a well-centered position relative to the platinum counter-electrode (in order to obtain a uniform deposit over the entire surface) and at a distance from the reference electrode that is constant and controlled in order to record the response of the system to polarization, always in the same manner as to ensure reproducibility of the measurements performed in situ;

1.10: preferred electrodeposition conditions: time=20 min; j=$-1$ mA·cm$^{-2}$; concentration of the bath=0.1 mol/L;

1.11: at the end of electrodeposition, extracting the part and then rinsing it in water, followed by rinsing for 30 seconds (s) in an alcohol solvent (ethanol) and drying in hot air (as in point 1.6);

1.12: storing for at least 24 h in dry air, preferably in a desiccator containing a substance for capturing humidity from the air (e.g. such as silica gel); and 1.13: heat treatment under an inert argon atmosphere for 1 h at 1050° C. with temperature being raised and lowered at a rate of 5° C./min.

The characteristics of the coating layer as obtained in this way are as follows:

Morphology and thickness: the coating layer obtained by electrodeposition covers the surface of the substrate in uniform manner with discontinuities in the form of cracks, giving rise to an appearance of the "dried mud" type. The distribution of the cracks is random, with the width of the cracks lying in the range 1 μm to 25 μm and the distance between cracks preferably lying in the range 5 μm to 50 μm. The cracks may pass completely or partially through the entire thickness of the coating layer. The thickness of the coating layer should lie in the range 1 μm to 100 μm. Under the coating layer based on rare earth oxide, it is possible for underlying layers to appear that result from the deposit reacting with the substrate. Their thickness should not exceed that of the coating layer.

Composition: the coating layers comprise in the range 0.10 at % to 35 at % of the elements of the lanthanide type and/or yttrium and/or zirconium and/or hafnium, in the range 0.5 at % to 75 at % of oxygen, and in the range 0.5 at % to 30 at % of nitrogen.

Crystal structure: prior to heat treatment, the coating layers comprise crystalline phases of oxides, hydroxides, nitrates, or combinations thereof with the lanthanide elements and/or yttrium and/or zirconium and/or hafnium, and a fraction of amorphous phases. After heat treatment, the entire coating layer is crystallized.

Microstructure: the microstructure of the coating layers includes elongate shapes (of the needle type), rounded shapes (of the spherical protuberance or cauliflower type), desert rose type shapes, and plate shapes. Their size does not exceed the inter-crack distance.

Defects: the coating layers include anionic and cationic type vacancy defects, in a variety of proportions (0.5% to 75%).

EXAMPLE 2

A $CeO_{2-x}$ coating layer is made on a nickel aluminide substrate (or on some other type of aluminide).

The same preparation for the electrolyte bath is used as in Example 1.

Here the substrate on which the rare earth oxide-based coating layer is electrodeposited consists in an intermetallic material (a bulk material or a coating) of the aluminide type containing 5 at % to 95 at % of Al, with the balance up to 100 at % comprising one or more metallic elements (in particular Ni, Fe, Ti, Pt, Co, Cr, Si, Ru).

On a bulk substrate, it is possible to apply a protocol for preparing the surface that is identical to that used for alloys or superalloys based on Ni. If the substrate is an aluminide coating, no surface preparation is needed other than degreasing and fixing as described in points 1.6 and 1.7.

The same electrodeposition process is implemented as that described above with reference to Example 1 (step 1.10). Optionally, because of the difference in electrochemical activity of aluminides compared with the activity of nickel-based alloys, the electrodeposition conditions are preferably an immersion time of 20 min with a current density $j=-0.5$ $mA/cm^2$, in particular if the substrate is a compound of the NiAl type. If the Ni (or metal) content of the aluminide is greater (e.g. in the compound $Ni_3Al$), then the current density may be increased, preferably to $-0.75$ $mA/cm^2$.

The steps following electrodeposition are similar to those implemented for nickel-based alloys or superalloys (steps 1.11 to 1.13).

The characteristics of the coating layer as obtained in this way are the same as those described with reference to Example 1.

EXAMPLE 3

A $CeO_{2-x}$ coating layer is made on a platinum-based substrate (material of the part or coating underlayer).

The entire procedure remains similar to that described for nickel-based alloys and superalloys (Example 1) except for the surface preparation (step 1.5): here no particular surface preparation is performed (no sand blasting, no mechanical polishing nor electropolishing nor any other treatment that might lead to a loss of platinum). Nevertheless, the degreasing and drying steps (step 1.6) remain similar.

The same electrodeposition process is implemented as that described in Example 1 for nickel-based substrates (step 1.10). However the deposition conditions are preferably: $t=20$ min and $j=-0.75$ $mA/cm^2$.

The characteristics of the coating layer as obtained in this way are the same as those described with reference to Example 1.

EXAMPLE 4

A $CeO_{2-x}$ coating layer is made on a substrate of nickel silicide (or of some other type of silicide).

The electrolytic bath is prepared in the same manner as in Example 1.

The substrate on which the rare earth oxide-based coating layer is electrodeposited consists in an intermetallic material (bulk or coating) of the silicide type containing in the range 5 at % to 95 at % Si. The balance up to 100 at consists in one or more metallic elements (in particular Mo and Fe).

The procedure is similar to that used for aluminides (Example 2) and the most favorable electrodeposition conditions are: time of 20 min and current density $j=-1.5$ $mA/cm^2$.

The characteristics of the coating layer as obtained in this way are the same as those described with reference to Example 1.

EXAMPLE 5

A $CeO_{2-x}$ coating layer is made on a substrate made of a composite material presenting some minimum level of electron conductivity.

The substrate may be constituted by any composite material having some minimum level of electron conductivity (e.g. a "cermet" having a Co matrix with tungsten carbide reinforcement).

If the composite material possesses a metal matrix (e.g.: the Co—WC cermet), it is possible to use the same protocols as those described above in Example 1 for nickel-based alloys and superalloys, but preferably applying a current density of $-1.5$ $mA/cm^2$ for 20 min.

If the composite material possesses an organic matrix, it is possible to use the same protocols as those described above (Example 1) for nickel-based alloys and superalloys, but with the following modifications a) to d):

a) no surface preparation (sand blasting);
b) degreasing only with an alcohol-water mixture;
c) current densities preferably of $-2.0$ $mA/cm^2$, for 20 min; and
d) heat treatment at a temperature that is of the order of two-thirds of the melting temperature of the compound having the lowest melting point in the composite material.

If the composite material possesses a ceramic matrix, it is possible to use the same protocols as those described above (Example 2) for aluminides, but with the following modifications a) and b):

a) applying a current density preferably of $-3.0$ $mA/cm^2$, for 30 min; and
b) using the same heat treatment but at a temperature of 1100° C.

The characteristics of the coating layer as obtained in this way are the same as those described with reference to Example 1.

The invention claimed is:

1. A method of fabricating a thermal barrier comprising a ceramic coating layer covering at least a portion of a structure of a substrate, the method comprising:
   depositing the ceramic coating layer on the substrate solely by cathodic electrodeposition, and
   heat treating the ceramic coating layer and the substrate together for at least 10 minutes at a temperature of from 400° C. to 2000° C. under argon at atmospheric pressure in the presence of at least 0.0001 bar (10 Pa) of oxygen, wherein cathodic electrodeposition is with an electrolyte and is between an anode and the substrate, as a cathode, wherein the substrate comprises an electron-conducting material, the electrolyte comprises a lanthanide salt, a yttrium salt, a zirconium salt, a hafnium salt, or a combination thereof, and the coating layer comprises a lanthanide oxide, a yttrium oxide, a zirconium oxide, a hafnium oxide, or a combination thereof.

2. The fabrication method of claim 1, wherein the electrolyte comprises at least two salts selected from the group consisting of a lanthanide salt, a yttrium salt, a zirconium salt, and a hafnium salt, and the coating layer comprises at least two oxides selected from the group consisting of a lanthanide oxide, a yttrium oxide, a zirconium oxide, and a hafnium oxide.

3. The fabrication method of claim 1, wherein the electrolyte comprises a cerium salt, and the coating layer comprises a cerium oxide.

4. The fabrication method of claim 1, wherein the substrate comprises at least one material selected from the group consisting of a superalloy; titanium; a titanium alloy; an intermetallic compound based on an aluminide, a silicide, or a combination thereof; a metal-matrix composite; a ceramic-matrix composite; and an organic-matrix composite.

5. The fabrication method of claim 1, wherein a total initial concentration of lanthanide salt, yttrium salt, zirconium salt, hafnium salt, or a combination thereof in the electrolyte is from 0.05 mol/L to 5 mol/L.

6. The fabrication method of claim 1, wherein the electrolyte comprises nitrate salt at a concentration greater than or equal to 0.05 mol/L.

7. The fabrication method of claim 1, wherein a pH of the electrolyte is less than 7.

8. The fabrication method of claim 1, wherein depositing the ceramic coating layer lasts for no more than 1 h.

9. The fabrication method of claim 1, wherein depositing the ceramic coating layer is by cathodic electrodeposition with a reference electrode.

10. The fabrication method of claim 1, wherein depositing the ceramic coating layer comprises applying a current between the substrate and the anode.

11. The fabrication method of claim 10, wherein a density of the current is from $-0.5$ mA/cm$^2$ to $-5$ mA/cm$^2$.

12. The fabrication method of claim 1, wherein depositing the ceramic coating layer comprises applying a voltage between the substrate and the anode.

13. The fabrication method of claim 12, wherein the voltage is from $-30$ V to $+30$ V.

14. The fabrication method of claim 1, further comprising drying the coating layer.

15. The fabrication method of claim 4, wherein the substrate comprises at least one superalloy selected from the group consisting of a nickel-based superalloy and a cobalt-based superalloy.

16. The fabrication method of claim 7, wherein the pH of the electrolyte is from 2.5 to 5.5.

17. The fabrication method of claim 1, wherein heat treating the ceramic coating layer is for 60 min at 1050° C.

18. The fabrication method of claim 1, wherein, when depositing the ceramic coating layer, each of the electrolyte, the substrate, and the anode are in a single vessel.

19. The fabrication method of claim 9, wherein the reference electrode is a saturated calomel electrode.

* * * * *